United States Patent [19]
Young et al.

[11] 3,955,991

[45] May 11, 1976

[54] ABSORPTIVE GLASS

[75] Inventors: Robert W. Young, Woodstock, Conn.; Robert E. Graf, Southbridge, Mass.

[73] Assignee: American Optical Corporation, Southbridge, Mass.

[22] Filed: Mar. 2, 1967

[21] Appl. No.: 621,728

[52] U.S. Cl. .................. 106/47 Q; 252/301.1 R; 106/54
[51] Int. Cl.² ............................................ C03C 9/00
[58] Field of Search ............... 106/47, 52, 54, 47 R, 106/47 Q; 252/478, 301.1 R

[56] References Cited
UNITED STATES PATENTS

| | | | |
|---|---|---|---|
| 2,859,163 | 11/1958 | Ploetz et al. ..................... | 252/478 X |
| 3,149,234 | 9/1964 | Hood et al. ..................... | 252/478 X |
| 3,149,984 | 9/1964 | Faulstich ........................... | 106/47 X |
| 3,193,400 | 7/1965 | Geffcken .............................. | 106/47 |
| 3,254,031 | 5/1966 | Paolis et al. ....................... | 106/47 X |
| 3,291,620 | 12/1966 | Sergeevich et al. .................... | 106/47 |

*Primary Examiner*—Stephen C. Bentley
*Assistant Examiner*—Peter A. Nelson
*Attorney, Agent, or Firm*—H. R. Berkenstock, Jr.; William C. Nealon

[57] ABSTRACT

Glass having an extremely high absorption coefficient for incident light in fiber optical image transfer devices and working compatibility with conventional light-conducting glasses used in the manufacture of such devices. The glass consists essentially of lanthanum trioxide, boron oxide, manganese dioxide, a colorant and glass forming, modifying and stabilizing ingredients.

4 Claims, No Drawings

ABSORPTIVE GLASS

BACKGROUND OF THE INVENTION

1. Field of the Invention

Glass compositions relating more particularly to improved light absorptive glass materials for use in fiber optical image-transfer devices.

2. Description of Prior Art

Fiber optical image-transfer devices such as are shown in application Ser. No. 238,372 now U.S. Pat. No. 3,387,959, entitled Fiber Optical Image Transfer Devices and Method of Making the Same, filed Nov. 19, 1962 and assigned to the same assignee as the present invention, have light-conducting optical fibers secured in bundled side-by-side relation with each other. Each optical fiber comprises a core filament, frequently formed of a lanthanum borate glass material surrounded by a cladding of a different glass material. The core filament material is of relatively higher refractive index than the fiber cladding material. Interspersed within this bundle between the light-conducting optical fibers are light-absorbing fibers each having a core filament of absorptive glass material surrounded by a cladding of a different light-transmitting glass material. Usually the same material is used for cladding both the light-conducting and light-absorbing fibers so that the claddings of both types of fibers can be easily fused together to form a vacuum-tight bundle of fibers. It will be understood that the core filaments and fiber cladding materials must be of compatible fusing temperature, drawing temperature, viscosity, coefficient of thermal expansion and the like so that the filament cores can be clad by conventional techniques and so that the fibers can be readily fused together. Particularly where the light-conducting fibers are to be drawn together with light-absorbing fibers to form multifiber units, it is desirable that the cores of both types of fibers be of compatible fusing temperature, drawing temperature etc. It will also be understood that, in order to perform their function as described in said copending application, the light-absorbing core materials are preferably adapted for extremely high absorption of incident light.

SUMMARY OF THE INVENTION

The absorptive glass material provided by this invention incorporates mixtures of lanthanum trioxide ($La_2O_3$) and boron oxide ($B_2O_3$) as its principal glass forming ingredients. Lanthanum trioxide is preferably used within the range from approximately 15 to 33 weight percent of the glass composition and boron trioxide is preferably used within the range of approximately 9 to 22 weight percent of the composition. Such glass materials can also incorporate silicon dioxide ($SiO_2$) within the range of approximately 0 to 8 weight percent as a glass forming ingredient of the materials. The glass compositions of this invention further embody barium oxide (BaO) as a modifier essential to the formation of the glass material, this ingredient preferably being incorporated within the range from approximately 4 to 30 weight percent. In addition, these glass materials can also incorporate other glass modifiers such as cadium oxide (CdO) within the range from about 0 to 12 weight percent and zinc oxide (ZnO) within the range from approximately 0 to 4 weight percent.

These novel and improved glass materials also include zirconium dioxide ($ZrO_2$) and tantalum oxide ($Ta_2O_5$) as stabilizers. Zirconium dioxide is preferably incorporated within the range from approximately 0 to 8 weight percent and tantalum oxide is incorporated within the range from about 7 to 12 weight percent. Other glass stabilizing ingredients can also be used within the scope of this invention. For example, tungsten trioxide ($WO_3$) can be incorporated in the glass materials within the range from about 0 to 6 weight percent of the glass composition; thorium dioxide ($ThO_2$) can be included in the materials within the range from about 0 to 2 weight percent; aluminum oxide ($Al_2O_3$) can be used, particularly to improve the durability of the glasses, within the range from about 0 to 0.6 weight percent; and columbium oxide ($Cb_2O_5$) can also be used within the range from approximately 0 to 9 weight percent.

In accordance with this invention, the highly absorptive lanthanum borate glasses must incorporate manganese dioxide ($MnO_2$) within the range from about 15 to 25 weight percent in order to attain the high optical density desired. In addition, these glass materials can also incorporate one or more other colorants selected from the group consisting of chromium oxide ($Cr_2O_3$), ferric oxide ($Fe_2O_3$), cobalt oxide ($Co_3O_4$), cupric oxide (CuO) and nickelic oxide ($Ni_2O_3$) for further increasing the optical density of the glass materials. The chromium oxide content of the materials is preferably limited to the range from 0 to 0.5 weight percent of the glass composition; the ferric oxide content is limited within the range from about 0 to 5 weight percent; the cobalt oxide content is limited to the range from about 0 to 4 weight percent; the cupric oxide content is limited to the range from about 0 to 5 weight percent; and the nickelic oxide content is limited to the range from about 0 to 3 weight percent.

DESCRIPTION OF THE PREFERRED EMBODIMENTS

The various ingredients of the glass materials of this invention can be varied within the limits as described so that the calculated oxide composition of the glass materials can be set forth as follows:

|  | Percent by Weight |
|---|---|
| Lanthanum Oxide ($La_2O_3$) | 15 to 33 |
| Boron Oxide ($B_2O_3$) | 9 to 22 |
| Silicon Dioxide ($SiO_2$) | 0 to 8 |
| Barium Oxide (BaO) | 4 to 30 |
| Cadmium Oxide (CdO) | 0 to 12 |
| Zinc Oxide (ZnO) | 0 to 4 |
| Zirconium Dioxide ($ZrO_2$) | 0 to 9 |
| Tantalum Oxide ($Ta_2O_5$) | 7 to 12 |
| Tungsten Trioxide ($WO_3$) | 0 to 6 |
| Thorium Dioxide ($ThO_2$) | 0 to 2 |
| Aluminum Oxide ($Al_2O_3$) | 0 to .6 |
| Columbium Oxide ($Cb_2O_5$) | 0 to 9 | said glass material including colorants selected from the group consisting of

|  | Percent by Weight |
|---|---|
| Manganese Dioxide ($MnO_2$) | 15 to 25 |
| Chromium Oxide ($Cr_2O_3$) | 0 to 0.5 |
| Ferric Oxide ($Fe_2O_3$) | 0 to 5 |
| Cobalt Oxide ($Co_3O_4$) | 0 to 4 |
| Cupric Oxide (CuO) | 0 to 5 |

-continued

| | Percent by Weight |
|---|---|
| Nickelic Oxide ($Ni_2O_3$) | 0 to 3 | said glass having an optical density of at least 0.25 in a sample sheet of glass of 100 microns thickness at least for light of wavelengths between 0.4 and 0.6 microns.

Although various conventional ingredients can be employed for forming a glass material having calculated oxide compositions as set forth above, a preferred raw batch composition for achieving the glass material of this invention could comprise the raw batch ingredients as follows:

EXAMPLE A (BATCH)

| | Parts by Weight |
|---|---|
| Lanthanum Trioxide | 112.24 |
| Boron Trioxide | 74.52 |
| Barium Nitrate $Ba(NO_3)_2$ | 46.04 |
| Zirconium Dioxide | 27.08 |
| Tantalum Pentoxide | 42.32 |
| Tungsten Trioxide | 21.16 |
| Manganese Dioxide | 93.60 |
| Chromium Trioxide | 2.00 |
| Total | 418.96 |

According to this invention, the described raw batch ingredients are weighed out and mixed in conventional manner and are placed in a platinum crucible. The crucible is then placed in an electrical furnace of the silicon carbide resistance type or other conventional furnace and the batch ingredients are melted at a temperature of 2500°– 2700° F. As the glass batch melts, additional batch material is added to the crucible until the desired batch size is attained. No special atmosphere is required in most cases but the noted batch ingredients will normally establish a neutral or mildly oxidizing atmosphere. On the other hand, as will be understood, a reducing atmosphere is preferred where ferric oxide is employed as a colorant. After the batch ingredients have been melted in this manner, the batch is maintained at a temperature of about 2500° F for fining of the batch in conventional manner. For a 10 pound batch size, this fining will require from 1 to 3 hours. The batch is then cast at a temperature from 2400°–2450° F., is annealed for several hours at temperatures from 1050°–1150° F., and can be slowly cooled to room temperature overnight.

The calculated oxide composition of glass prepared from such batch ingredients is as follows:

Example A

| | Percent by Weight |
|---|---|
| Lanthanum Oxide ($La_2O_3$) | 28.06 |
| Boron Oxide ($B_2O_3$) | 18.63 |
| Barium Oxide (BaO) | 6.77 |
| Zirconium Dioxide ($ZrO_2$) | 6.77 |
| Tantalum Oxide ($Ta_2O_5$) | 10.58 |
| Tungsten Trioxide ($WO_3$) | 5.29 |
| Manganese Dioxide ($MnO_2$) | 23.40 |
| Chromium Oxide ($Cr_2O_3$) | 0.50 |
| | 100.00 | said glass having an optical density of at least 0.25 in a sample sheet of said glass of 100 microns thickness at least for light of wavelengths from 0.4 to 0.6 microns.

Other examples illustrating calculated oxide compositions of absorptive glass materials provided by this invention are as follows:

Example B

| | Percent by Weight |
|---|---|
| Lanthanum Oxide ($La_2O_3$) | 20.17 |
| Boron Oxide ($B_2O_3$) | 18.49 |
| Barium Oxide (BaO) | 4.87 |
| Cadmium Oxide (CdO) | 10.65 |
| Zinc Oxide (ZnO) | 3.73 |
| Zirconium Dioxide ($ZrO_2$) | 6.77 |
| Tantalum Oxide ($Ta_2O_5$) | 7.61 |
| Tungsten Trioxide ($WO_3$) | 3.81 |
| Manganese Dioxide ($MnO_2$) | 23.40 |
| Chromium Oxide ($Cr_2O_3$) | 0.50 |
| | 100.00 | said glass having an optical density of at least 0.25 in a sample sheet of glass of 100 microns thickness at least for light of wavelengths from 0.4 to 0.6 microns.

Example C

| | Percent by Weight |
|---|---|
| Lanthanum Oxide ($La_2O_3$) | 31.33 |
| Boron Oxide ($B_2O_3$) | 20.81 |
| Barium Oxide (BaO) | 7.56 |
| Zirconium Dioxide ($ZrO_2$) | 7.56 |
| Tantalum Oxide ($Ta_2O_5$) | 11.83 |
| Tungsten Trioxide ($WO_3$) | 5.91 |
| Manganese Dioxide ($MnO_2$) | 15.00 |
| | 100.00 | said glass having an optical density of at least 0.25 in a sample sheet of glass of 100 microns thickness at least for light of wavelengths from 0.4 to 0.6 microns.

Other examples of glass compositions provided by this invention, all of which provide optical densities of at least 0.25 for light of wavelengths from 0.4 to 0.6 microns, are as follows:

| | Percent by Weight | | | | |
|---|---|---|---|---|---|
| | Ex.D | Ex.E | Ex.F | Ex.G | Ex.H |
| $La_2O_3$ | 26.77 | 26.21 | 26.21 | 30.22 | 15.50 |
| $B_2O_3$ | 17.77 | 17.40 | 17.40 | 20.07 | 9.58 |
| $SiO_2$ | — | — | — | — | 7.09 |
| BaO | 6.46 | 6.33 | 6.33 | 7.30 | 28.86 |
| $ZrO_2$ | 6.46 | 6.33 | 6.33 | 7.30 | — |
| $Ta_2O_5$ | 10.10 | 9.89 | 9.89 | 11.41 | 9.27 |
| $WO_3$ | 5.04 | 4.94 | 4.94 | 5.70 | 4.25 |
| $ThO_2$ | — | — | — | — | 1.84 |
| $Al_2O_3$ | — | — | — | — | 0.53 |
| $Cb_2O_5$ | — | — | — | — | 8.08 |
| $MnO_2$ | 23.40 | 23.40 | 23.40 | 15.00 | 15.00 |
| $Cr_2O_3$ | 0.50 | 0.50 | 0.50 | — | — |
| $Fe_2O_3$ | — | — | 5.00 | — | — |
| $Co_3O_4$ | 3.50 | — | — | — | — |
| CuO | — | 5.00 | — | — | — |
| $Ni_2O_3$ | — | — | — | 3.00 | — |
| | 100.00 | 100.00 | 100.00 | 100.00 | 100.00 |

| | Percent by Weight | | | | |
|---|---|---|---|---|---|
| | Ex.I | Ex.J | Ex.K | Ex.L | Ex.M |
| $La_2O_3$ | 28.12 | 28.23 | 30.96 | 30.22 | 30.96 |
| $B_2O_3$ | 18.68 | 18.75 | 20.56 | 20.07 | 20.56 |
| BaO | 6.79 | 6.82 | 7.48 | 7.30 | 7.48 |
| $ZrO_2$ | 6.79 | 6.82 | 7.48 | 7.30 | 7.48 |
| $Ta_2O_5$ | 10.62 | 10.66 | 11.68 | 11.41 | 11.68 |
| $WO_3$ | 5.30 | 5.32 | 5.84 | 5.70 | 5.84 |
| $MnO_2$ | 23.40 | 23.40 | 15.00 | 15.00 | 15.00 |
| $Cr_2O_3$ | 0.30 | — | — | — | — |
| $Co_3O_4$ | — | — | 1.00 | — | — |
| CuO | — | — | — | 3.00 | — |

-continued

Percent by Weight

|  | Ex.I | Ex.J | Ex.K | Ex.L | Ex.M |
|---|---|---|---|---|---|
| Ni$_2$O$_3$ | — | — | — | — | 1.00 |
|  | 100.00 | 100.00 | 100.00 | 100.00 | 100.00 |

The absorptive glasses of this invention are durable and stable and are chemically and thermally compatible with conventional glasses employed in optical fibers. The glasses are of good quality and are substantially free of bubbles, seeds and other inclusions. Generally, the glasses do not tend to bloom (form surface films) or to devitrify as do other extremely absorptive glasses. In particular, the improved absorptive glasses have fusing temperatures, drawing temperatures, viscosities and coefficients of thermal expansion compatible with the lanthanum borate glasses conventionally employed as core materials in light-conducting optical fibers. The absorptive glasses can be readily drawn, clad and fused together with conventional optical fiber glass materials, and, when embodied in fiber optical image transfer devices such as noted in the aforesaid copending application, can be conveniently ground and polished by conventional techniques. These novel glass materials are also chemically compatible with phosphors and the like conventionally employed with fiber optical image-transfer devices.

It will be understood that the examples of glass materials described herein have been described by way of illustration and that this invention includes all modifications and equivalents of said glasses which fall within the scope of the appended claims.

We claim:

1. An absorptive glass material having a calculated oxide composition comprising

|  | Percent by Weight |
|---|---|
| Lanthanum Oxide (La$_2$O$_3$) | 15 to 33 |
| Boron Oxide (B$_2$O$_3$) | 9 to 22 |
| Silicon Dioxide (SiO$_2$) | up to 8 |
| Barium Oxide (BaO) | 4 to 30 |
| Cadmium Oxide (CdO) | up to 12 |
| Zinc Oxide (ZnO) | up to 4 |
| Zirconium Dioxide (ZrO$_2$) | up to 9 |
| Tantalum Oxide (Ta$_2$O$_5$) | 7 to 12 |
| Tungsten Trioxide (WO$_3$) | up to 6 |
| Thorium Dioxide (ThO$_2$) | up to 2 |
| Aluminum Oxide (Al$_2$O$_3$) | up to 0.6 |
| Columbium Oxide (Cb$_2$O$_5$) | up to 9 | said glass material including colorants selected from the group consisting of

|  | Percent by Weight |
|---|---|
| Manganese Dioxide (MnO$_2$) | 15 to 25 |
| Chromium Oxide (Cr$_2$O$_3$) | up to 0.5 |
| Ferric Oxide (Fe$_2$O$_3$) | up to 5 |
| Cobalt Oxide (Co$_3$O$_4$) | up to 4 |
| Cupric Oxide (CuO) | up to 5 |
| Nickelic Oxide (Ni$_2$O$_3$) | up to 3 | said glass having an optical density of at least 0.25 at least for light of wavelengths between 0.4 and 0.6 microns.

2. An absorptive glass material having a calculated oxide composition comprising

|  | Percent by Weight |
|---|---|
| Lanthanum Oxide (La$_2$O$_3$) | 28.06 |
| Boron Oxide (B$_2$O$_3$) | 18.63 |
| Barium Oxide (BaO) | 6.77 |
| Zirconium Dioxide (ZrO$_2$) | 6.77 |
| Tantalum Oxide (Ta$_2$O$_5$) | 10.58 |
| Tungsten Trioxide (WO$_3$) | 5.29 |
| Manganese Dioxide (MnO$_2$) | 23.40 |
| Chromium Oxide (Cr$_2$O$_3$) | 0.50 |
| Total | 100.00 | said glass having an optical density of at least 0.25 in a sample sheet of said glass of 100 microns thickness at least for light of wavelengths from 0.4 to 0.6 microns.

3. An absorptive glass material having a calculated oxide composition comprising

|  | Percent by Weight |
|---|---|
| Lanthanum Oxide (La$_2$O$_3$) | 20.17 |
| Boron Oxide (B$_2$O$_3$) | 18.49 |
| Barium Oxide (BaO) | 4.87 |
| Cadmium Oxide (CdO) | 10.65 |
| Zinc Oxide (ZnO) | 3.73 |
| Zirconium Dioxide (ZrO$_2$) | 6.77 |
| Tantalum Oxide (Ta$_2$O$_5$) | 7.61 |
| Tungsten Trioxide (WO$_3$) | 3.81 |
| Manganese Dioxide (MnO$_2$) | 23.40 |
| Chromium Oxide (Cr$_2$O$_3$) | 0.50 |
| Total | 100.00 | said glass having an optical density of at least 0.25 in a sample sheet of said glass of 100 microns thickness at least for light of wavelengths from 0.4 to 0.6 microns.

4. An absorptive glass material having a calculated oxide composition comprising

|  | Percent by Weight |
|---|---|
| Lanthanum Oxide (La$_2$O$_3$) | 31.33 |
| Boron Oxide (B$_2$O$_3$) | 20.81 |
| Barium Oxide (BaO) | 7.56 |
| Zirconium Dioxide (ZrO$_2$) | 7.56 |
| Tantalum Oxide (Ta$_2$O$_5$) | 11.83 |
| Tungsten Trioxide (WO$_3$) | 5.91 |
| Manganese Dioxide (MnO$_2$) | 15.00 |
| Total | 100.00 | said glass having an optical density of at least 0.25 in a sample sheet of glass of 100 microns thickness at least for light of wavelengths from 0.4 to 0.6 microns.

* * * * *